United States Patent
Blanchon et al.

(10) Patent No.: US 6,783,718 B2
(45) Date of Patent: Aug. 31, 2004

(54) MOLD WITH A MOVING JOINT FACE FOR MAKING A PLASTICS MATERIAL PIECE, AND A METHOD USING SUCH A MOLD

(75) Inventors: Charles-Guillaume Blanchon, Oyonnax (FR); Thierry Vuaillat, Veyziat (FR)

(73) Assignee: Compagnie Plastic Omnium, Lyons (FR)

(*) Notice: Subject to any disclaimer, the term of this patent is extended or adjusted under 35 U.S.C. 154(b) by 458 days.

(21) Appl. No.: 09/765,296

(22) Filed: Jan. 22, 2001

(65) Prior Publication Data
US 2002/0158365 A1 Oct. 31, 2002

(30) Foreign Application Priority Data
Jan. 24, 2000 (FR) .............................. 00 00858

(51) Int. Cl.[7] .............................. B29C 70/48
(52) U.S. Cl. .............. 264/257; 264/258; 264/266; 264/274; 264/324; 264/325; 264/328.1; 425/112; 425/125; 425/126.1; 425/127; 425/129.1
(58) Field of Search .............................. 264/257, 258, 264/266, 274, 255, 324, 325, 328.1; 425/125, 126.1, 127, 129.1, 112

(56) References Cited

U.S. PATENT DOCUMENTS 5,795,526 A * 8/1998 Matsumoto et al. ........ 264/266
5,993,719 A * 11/1999 Abe et al. .................. 264/257
6,096,251 A * 8/2000 D'Hooren .................. 264/163
6,413,461 B1 * 7/2002 Kobayashi et al. ......... 264/257

FOREIGN PATENT DOCUMENTS

| EP | 0 127 159 | 12/1984 |
|---|---|---|
| EP | 0 186 015 | 7/1986 |
| EP | 01022521 | 1/1989 |
| EP | 0 500 033 | 8/1992 |
| EP | 0 531 977 | 3/1993 |
| EP | 06344377 | 12/1994 |
| EP | 07214593 | 8/1995 |
| EP | 10230521 | 9/1998 |
| EP | 11077815 | 3/1999 |
| JP | A 5-148439 | 5/1993 |

* cited by examiner

Primary Examiner—Stefan Staicovici
(74) Attorney, Agent, or Firm—Oliff & Berridge, PLC

(57) ABSTRACT

A mold to make a plastics material piece includes two parts defining a cavity corresponding to the piece to be made, each part has a peripheral zone for coming into contact with the other part's peripheral zone to define the mold's joint face. One part is made up of two blocks, namely a central block and a peripheral block, the two blocks suitable for sliding relative to each other in the mold closure direction, and the peripheral block capable of movement so as to move the peripheral zone away from the edges of the sheet. A method of making a plastics material piece includes placing a sheet in a part of a mold, moving a peripheral block, closing the mold, and moving the peripheral block to a molding position while keeping the first and second peripheral zones in contact.

10 Claims, 2 Drawing Sheets

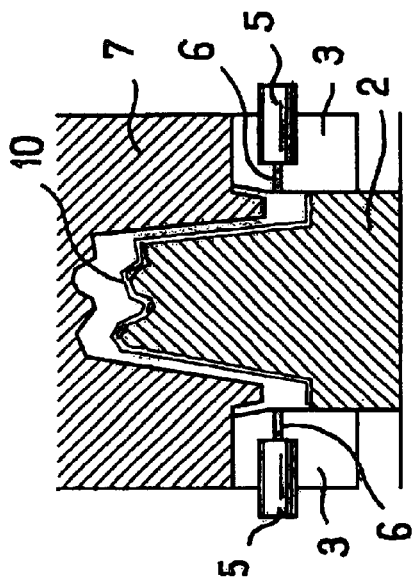
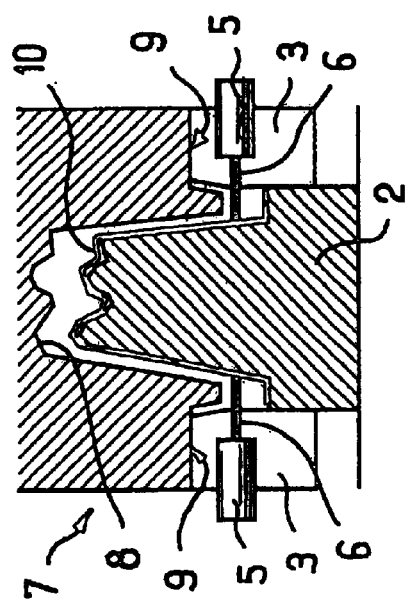
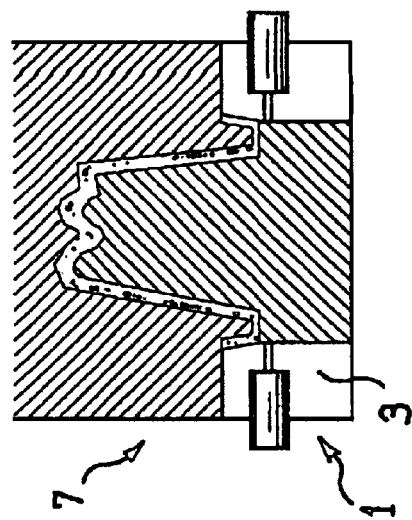
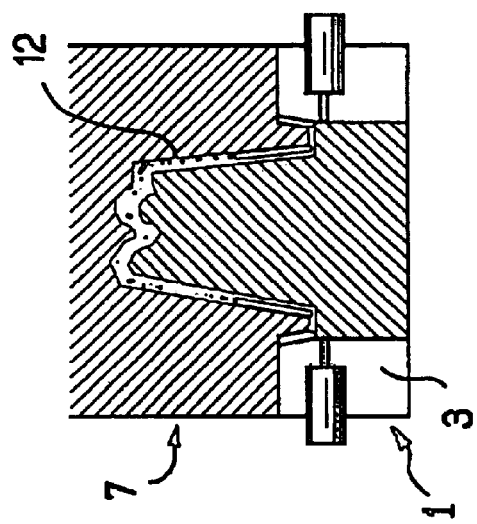
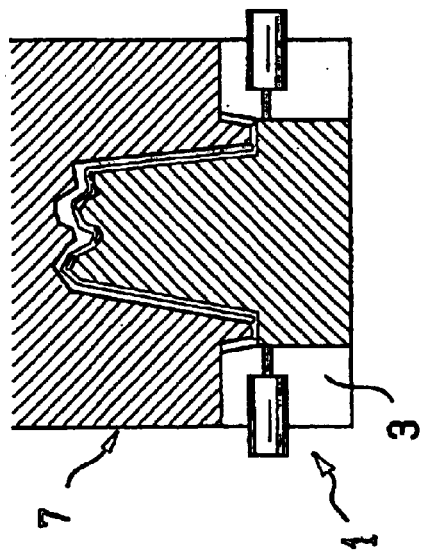

MOLD WITH A MOVING JOINT FACE FOR MAKING A PLASTICS MATERIAL PIECE, AND A METHOD USING SUCH A MOLD

The present invention relates to a mold having a moving joint face for making a plastics material piece, and to a method using such a mold.

BACKGROUND OF THE INVENTION

It is known to make pieces out of plastics material by injection molding or by extrusion-compression methods in a two-part mold defining a recess.

Each of the two parts of the mold has a peripheral zone for coming into contact with the peripheral zone of the other part of the mold.

The joint face of the mold is the face defined by these two peripheral zones when they bear against each other.

In some cases, the peripheral zones of the mold parts cannot be plane. However even under such circumstances, the term joint "face" is still used to designate the surface constituted by the two peripheral zones that bear one against the other.

It is also known to make pieces out of reinforced plastics material comprising one or more reinforcing sheets that can be constituted, for example, by mats of reinforcing fibers or by fabrics; e.g. those known under the initials HTPC.

This reinforcing sheet is placed in the open mold, e.g. on the punch, i.e. the male portion of the mold, and then the mold is closed. A certain quantity of plastics material is then delivered to the mold either by extrusion before it is closed or by injection after it is closed.

Those known methods of making reinforced plastics material pieces give satisfaction, but they require a certain amount of retouching work since the reinforcing sheet does not always take up exactly the proper location in the mold, such that some of its peripheral edges are sometimes pinched in the joint face of the mold between the two pressed-together peripheral zones of the two mold parts.

A trimming operation is then necessary on leaving the mold in order to remove those portions of the reinforcing sheet that project outside the part.

OBJECTS AND SUMMARY OF THE INVENTION

The present invention seeks to provide a mold whose structure prevents the risk of a sheet becoming pinched in its joint face.

The present invention provides a mold for making a plastics material piece, the mold comprising two parts defining between them a cavity corresponding to the piece that is to be made, each mold part having a peripheral zone for coming into contact with the peripheral zone of the other mold part, the two zones, when united, defining the joint face of the mold, wherein one of the mold parts is designed to receive a sheet and is made up of two blocks, namely a central block defining substantially the mold cavity and a peripheral block supporting the peripheral zone, the two blocks being suitable for sliding relative to each other in the mold closure direction, the peripheral block being movable so as to move the peripheral zone of said peripheral block away from the edges of the sheet.

The mold of the invention presents the advantage that the peripheral block can be moved prior to the operation of closing the mold in such a manner that a sheet already inserted in the mold cannot be pinched in the joint face of the mold when the mold closes.

With the mold of the invention it is possible to begin by placing the reinforcing sheet (or any other sheet for incorporation or overmolding in the piece that is to be made) in the two-block part of the mold.

With the mold being held open, the peripheral block is then moved in such a manner as to cause its peripheral zone to move away from the sheet, so as to be sure that the peripheral edges of said sheet do not project over the peripheral zone defining the joint face.

Once the peripheral block has been moved, the other mold part is moved into position until its peripheral zone comes to bear on the peripheral zone remote from the sheet.

At this stage, the joint face of the mold has been reconstituted by the two peripheral zones of the two mold parts bearing against each other at a distance from the sheet that is sufficient to guarantee that it is not pinched in the joint face.

Finally, the peripheral block is moved back into the molding position while keeping the two peripheral zones in contact, thereby finally closing the mold which is thus returned to its normal molding configuration.

The plastics material can be introduced by injection at the end of the above-described operations, or by extrusion at a moment when the mold is still open.

The peripheral block may also have actuators controlling holding rods.

The invention also provides a method of using a mold as specified above and comprising the following steps:

placing a sheet for incorporation or overmolding in the piece that is to be made in the two-block part of the mold;

moving the peripheral block so as to move the peripheral zone away from the edges of the sheet;

closing the mold by bringing the peripheral zone of the other mold part into contact with the peripheral zone of the peripheral block; and returning the peripheral block to the molding position while keeping the two peripheral zones in contact.

The peripheral block is preferably moved without displacing or touching the sheet.

The invention also provides a method of using a mold to make a plastics material piece, the mold comprising two parts defining between a cavity corresponding to the piece to be made, each mold part having a peripheral zone for coming into contact with the peripheral zone of the other mold part, the two zones, when united in this way, defining the joint face of the mold, one of the mold parts being made up of two blocks, namely a central block substantially defining the mold cavity and a peripheral block both supporting the peripheral zone and having actuators which control holding rods, the two blocks being suitable for sliding relative to each other in the mold closure direction, said method comprising the following steps:

placing a reinforcing sheet for incorporation or overmolding in the piece to be made in the two-block part of the mold;

moving the peripheral block to move the peripheral zone away from the edges of the reinforcing sheet;

actuating the actuators to bring the holding rods against the reinforcing sheet;

retracting the actuators;

closing the mold by bringing the peripheral zone of the other mold part into contact with the peripheral zone of the peripheral block; and returning the peripheral block to the molding position while keeping the two peripheral zones in contact.

The reinforcing sheet can optionally be preformed outside the mold.

The peripheral block can optionally be moved upwardly to move the peripheral zone away from the edges of the reinforcing sheet.

BRIEF DESCRIPTION OF THE DRAWINGS

In order to make the invention easier to understand, there follows a description of an implementation given by way of non-limiting example with reference to the accompanying drawings, showing eleven diagrams corresponding to eleven successive steps in the above-described method.

FIG. 7 illustrates a seventh step of a method according to the invention.

FIG. 8 illustrates an eighth step of a method according to the invention.

FIG. 9 illustrates a ninth step of a method according to the invention.

FIG. 10 illustrates a tenth step of a method according to the invention.

FIG. 11 illustrates an eleventh step of a method according to the invention.

MORE DETAILED DESCRIPTION

Figure 1:
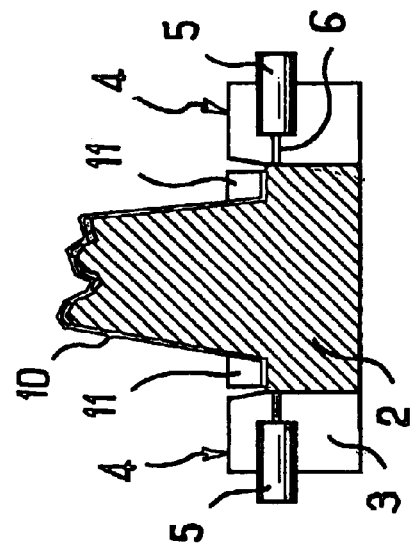
FIG. 1 illustrates a first step of a method according to the invention.
Figure 2:
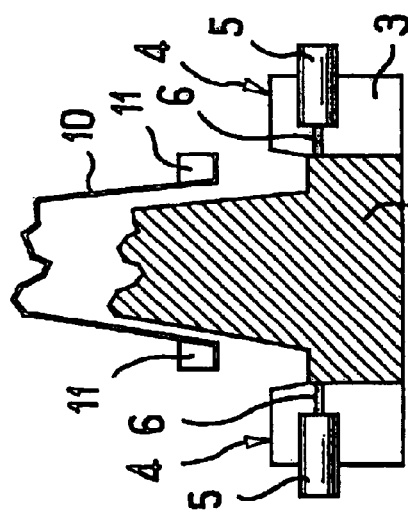
FIG. 2 illustrates a second step of a method according to the invention.
Figure 3:
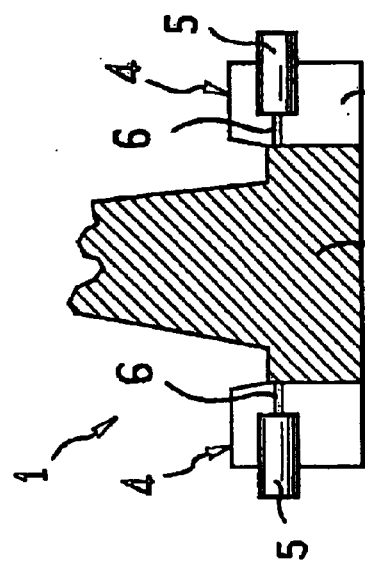
FIG. 3 illustrates a third step of a method according to the invention.
Figure 4:
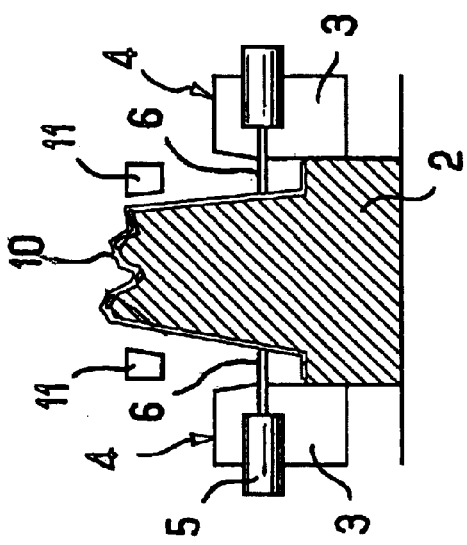
FIG. 4 illustrates a fourth step of a method according to the invention.
Figure 5:
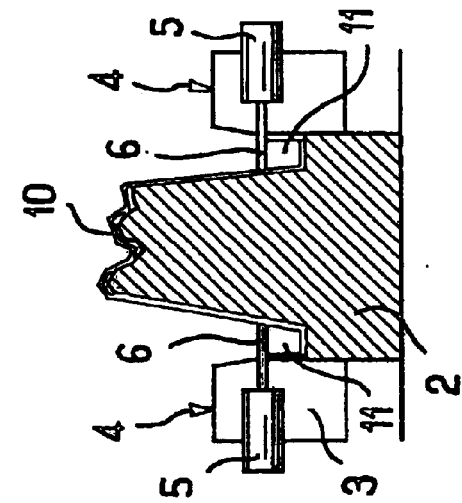
FIG. 5 illustrates a fifth step of a method according to the invention.
Figure 6:
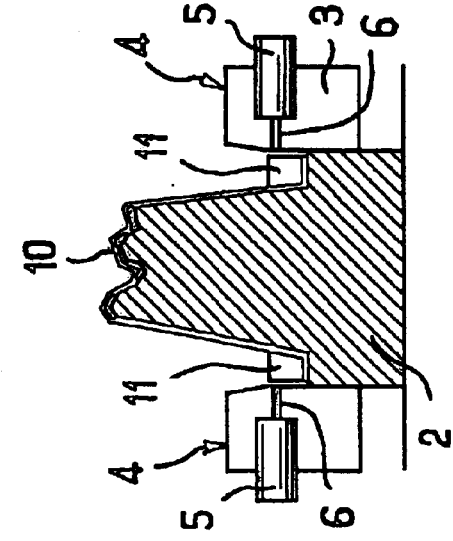
FIG. 6 illustrates a sixth step of a method according to the invention.

The mold shown in the drawings comprises a first part 1 or "punch" constituted by two blocks, a central block 2 and a peripheral block 3.

The central block 2 substantially defines the mold cavity.

The peripheral block 3 supports a peripheral zone 4 corresponding to the joint face of the mold.

The peripheral block 3 can slide axially around the central block 2 in the mold closure direction the example shown, the peripheral block 3 also has actuators 5 controlling holding rods 6 whose function is described below.

The mold also has a second part 7 or "matrix" whose shape can be seen in the diagrams corresponding to steps 7 to 11.

The matrix 7 has a central portion 8 complementary to the central block of the punch and co-operating with this central block to define the shape of the piece that is to be made.

At its periphery, the matrix 7 has a peripheral zone 9 corresponding to the joint face of the mold and designed to bear against the peripheral zone 4 of the punch.

The eleven steps shown are described below in succession.

During step No. 1, the punch 1 is in its molding position, with its peripheral block 3 being in its low position (in the orientation of the figures).

In step No. 2, a reinforcing sheet 10 of the HTPC type is applied to the punch, said sheet having been preformed outside the mold. The sheet is delivered by means of a handling tool 11 represented diagrammatically by two section members that press the edges of the preformed sheet against the base of the punch.

In step No. 3, the sheet 10 is in position on the punch and it is held in position by the section members 11.

In step No. 4, the peripheral block 3 of the punch is moved to its high position. In this position, the peripheral zone 4 of the punch which defines the joint face of the mold is remote from the edges of the reinforcing sheet.

This operation guarantees that the edges of the reinforcing sheet do not overlap into the peripheral zone defining the joint face, even in the event of the reinforcing sheet being poorly centered on the punch and projecting slightly from the recess proper.

In step No. 5, the actuators 5 are actuated to bring the holding rods 6 against the reinforcing sheet so as to allow the section members 11 to be withdrawn, as can be seen in step No. 6.

The reinforcing sheet is held on the punch by the holding rods 6 so the method can also be implemented with the mold being oriented in such a manner that its closure direction is horizontal.

The peripheral block of the punch is held in its high position (relative to the orientation of the figures).

In step No. 7, the matrix 7 is moved towards the punch until its peripheral zone 9 comes to bear against the peripheral zone 4 of the punch.

Because of the offset between the joint face and the edges of the sheet 10, it is not possible for the sheet to be pinched in the joint face of the mold.

In step No. 8, the actuators 5 are actuated, this time to retract the holding rods. The sheet might at this point move a little in the mold but there is no risk of it becoming pinched in the joint face.

In step No. 9, the peripheral block 3 of the punch is returned to its low position (relative to the figures) and simultaneously closure of the mold is continued so that the matrix 7 remains pressed against the peripheral block 3 via the joint face.

The mold is thus put into its molding position. A plastics material 12 can be injected into the mold, as can be seen in step No. 10.

In step No. 11, injection has terminated and the reinforced piece is obtained.

Because the edges of the sheet are not held captive in the joint face of the mold, there is no need for any trimming operation to be performed on the piece.

Naturally, the implementation described above is not limiting in any way and could receive any desirable modification without thereby going beyond the ambit of the invention.

What is claimed is:

1. A mold for making a plastics material piece, comprising:
    a first part having a first peripheral zone;
    a second part configured for receiving a sheet, said second part comprising:
        a central block being configured to form with the first part a cavity for making the piece;
        a peripheral block having a second peripheral zone, said first and second peripheral zones, when in contact, defining a joint face of the mold, said peripheral block being suitable for sliding relative to said central block in a mold closure direction so as to move the second peripheral zone away from edges of the sheet, said peripheral block having holding rods.

2. A mold according to claim 1, wherein the peripheral block has at least one actuator that controls the holding rods.

3. A method of making a plastics material piece, using a mold comprising:

a first part having a first peripheral zone;

a second part configured for receiving a sheet, said second part comprising:
- a central block being configured to form with the first part a cavity for making the piece;
- a peripheral block having a second peripheral zone, said first and second peripheral zones, when in contact, defining a joint face of the mold, said peripheral block being suitable for sliding relative to said central block in a mold closure direction so as to move the second peripheral zone away from edges of the sheet;

wherein the method comprises:
- placing a sheet having edges for incorporation or overmolding in the piece that is to be made in the second part of the mold;
- moving the peripheral block so as to move the second peripheral zone away from the edges of the sheet;
- closing the mold by bringing the first peripheral zone into contact with the second peripheral zone such that the sheet is not pinched in the joint face; and
- moving the peripheral block to a molding position while keeping the first and second peripheral zones in contact.

4. A method according to claim 3, wherein the peripheral block is moved without displacing the sheet.

5. A method according to claim 4, wherein the peripheral block is moved without touching the sheet.

6. A method of making a plastics material piece, using a mold comprising:

a first part having a first peripheral zone;

a second part configured for receiving a sheet, said second part comprising:
- a central block being configured to form with the first part a cavity for making the piece;
- a peripheral block having a second peripheral zone, said first and second peripheral zones, when in contact, defining a joint face of the mold, said peripheral block being suitable for sliding relative to said central block in a mold closure direction so as to move the second peripheral zone away from edges of the sheet, said peripheral block having holding rods, said method comprising:
- placing a reinforcing sheet having edges for incorporation or overmolding in the piece to be made in the second part;
- moving the peripheral block to move the second peripheral zone away from the edges of the reinforcing sheet;
- bringing the holding rods against the reinforcing sheet;
- retracting the holding rods;
- closing the mold by bringing the first peripheral zone into contact with the second peripheral zone such that the sheet is not pinched in the joint face; and
- moving the peripheral block to a molding position while keeping the first and second peripheral zones in contact.

7. A method according to claim 6, wherein the reinforcing sheet is preformed outside the mold.

8. A method according to claim 6, wherein the peripheral block is moved upwardly to move the peripheral zone away from the edges of the reinforcing sheet.

9. A method according to claim 6, wherein a plastics material is deposited in the mold cavity before closing the mold.

10. A method according to claim 6, wherein a plastics material is injected in the cavity after closing the mold.

* * * * *